US011345861B2

(12) United States Patent
Choi et al.

(10) Patent No.: US 11,345,861 B2
(45) Date of Patent: May 31, 2022

(54) PRODUCTION OF LINEAR OLEFINS FROM HEAVY OIL

(71) Applicant: Saudi Arabian Oil Company, Dhahran (SA)

(72) Inventors: Ki-Hyouk Choi, Dhahran (SA); Abdullah Alabdulhadi, Dhahran (SA); Joo-Hyeong Lee, Dhahran (SA); Ali Alsomali, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/908,511

(22) Filed: Jun. 22, 2020

(65) Prior Publication Data

US 2021/0395614 A1    Dec. 23, 2021

(51) Int. Cl.
| | |
|---|---|
| *C10G 49/18* | (2006.01) |
| *C10G 1/02* | (2006.01) |
| *B01J 3/00* | (2006.01) |
| *C10G 1/08* | (2006.01) |

(52) U.S. Cl.
CPC ............. *C10G 1/02* (2013.01); *B01J 3/008* (2013.01); *C10G 1/08* (2013.01); *C10G 2300/1085* (2013.01); *C10G 2300/1092* (2013.01); *C10G 2300/4012* (2013.01);
(Continued)

(58) Field of Classification Search
CPC .... C10G 1/02; C10G 1/08; C10G 2300/4012; C10G 2300/805; C10G 2300/1085; C10G 2300/1092; C10G 2400/30; C10G 2400/20; C10G 49/18; B01J 3/008; C07C 2/42

See application file for complete search history.

(56) References Cited

U.S. PATENT DOCUMENTS

| | | | | |
|---|---|---|---|---|
| 3,037,062 A | * | 5/1962 | Gerhold | .............. C07C 7/10 |
| | | | | 208/319 |
| 3,284,347 A | * | 11/1966 | Hutton | ............... C10G 21/18 |
| | | | | 208/333 |
| 3,948,754 A | | 4/1976 | McCollum et al. | |

(Continued)

OTHER PUBLICATIONS

PCT International Search Report and Written Opinion of the International Searching Authority, issued for PCT/US2021/038383, dated Sep. 24, 2021, 13 pages.

*Primary Examiner* — Michelle Stein
(74) *Attorney, Agent, or Firm* — Bracewell LLP; Constance G. Rhebergen; Eleanor L. Tyson

(57) ABSTRACT

A process for producing olefins comprising the steps of separating the liquid oil in the fractionator to produce a light oil product; separating the light oil product in the extractor to produce a paraffin fraction stream; increasing a pressure of the paraffin fraction stream in a paraffin pump to produce a pressurized paraffin stream; mixing the pressurized paraffin stream with a pressurized water feed in the water mixer to produce a paraffin-containing water stream; heating the paraffin-containing water stream in the water heater to produce a hot paraffin-water stream, wherein a temperature of the hot paraffin-water stream is greater than 450 deg C., wherein the short chain paraffins are operable to crack at the temperature of the hot paraffin-water stream; mixing the hot paraffin-water stream and the hot feedstock in the feed mixer to produce a mixed feed stream; and introducing the mixed feed stream to the supercritical unit.

9 Claims, 4 Drawing Sheets

(52) U.S. Cl.
CPC ... *C10G 2300/805* (2013.01); *C10G 2400/20* (2013.01); *C10G 2400/30* (2013.01)

(56) References Cited

U.S. PATENT DOCUMENTS

| | | | |
|---|---|---|---|
| 4,042,488 A | 8/1977 | Perciful | |
| 4,483,761 A | 11/1984 | Paspek, Jr. | |
| 4,818,370 A | 4/1989 | Gregoli et al. | |
| 6,211,423 B1* | 4/2001 | Slaugh | C07C 1/0485 585/804 |
| 7,591,983 B2 | 9/2009 | Takahashi et al. | |
| 9,650,578 B2 | 5/2017 | De Klerk et al. | |
| 9,925,532 B2 | 3/2018 | Zhao et al. | |
| 10,010,839 B2 | 7/2018 | Choi et al. | |
| 10,066,172 B2 | 9/2018 | Choi et al. | |
| 10,119,081 B2 | 11/2018 | Choi et al. | |
| 10,160,924 B2 | 12/2018 | Merdrignac et al. | |
| 2008/0099374 A1* | 5/2008 | He | B01J 3/008 208/177 |
| 2009/0152168 A1* | 6/2009 | Siskin | C10G 45/02 208/229 |
| 2012/0061291 A1* | 3/2012 | Choi | C10G 49/22 208/53 |
| 2012/0151834 A1 | 6/2012 | Duyvesteyn et al. | |
| 2014/0109465 A1* | 4/2014 | Coppola | B01J 19/2405 44/307 |
| 2014/0138287 A1* | 5/2014 | De Klerk | C10G 21/003 208/390 |
| 2015/0321975 A1* | 11/2015 | Choi | C07C 4/04 585/400 |
| 2016/0312129 A1* | 10/2016 | Choi | B01J 3/008 |
| 2017/0166821 A1* | 6/2017 | Choi | C10G 47/32 |
| 2018/0010057 A1 | 1/2018 | Coppola et al. | |
| 2018/0187096 A1* | 7/2018 | Choi | C10L 3/00 |
| 2018/0265792 A1* | 9/2018 | Choi | C10G 69/06 |
| 2019/0249093 A1 | 8/2019 | Choi et al. | |
| 2019/0249096 A1* | 8/2019 | Choi | C10G 31/08 |

\* cited by examiner

PRODUCTION OF LINEAR OLEFINS FROM HEAVY OIL

TECHNICAL FIELD

Disclosed are methods for upgrading hydrocarbons. Specifically, disclosed are methods and systems for producing 1-olefins as part of a process for upgrading hydrocarbons.

BACKGROUND

Olefins, including α-olefins, are useful and valuable chemicals when used as a raw material. For example, α-olefins can be used as a raw material for the production of linear low density polyethylene (LLDPE), high density polyethylene (HDPE), polyalphaolefin (PAO), linear alkyl benzene (LAB), and linear alkyl benzene sulfonate (LABS). Alpha-olefins for use as a raw material are generally produced as the primary production product, such as in the Ziegler process.

The Ziegler process and other processes can be produced by organometallic catalysts. The Ziegler process uses ethylene as a feed material and oligomerizes it into a linear α-olefins. Another catalytic process is catalytic dehydrogenation of n-paraffins. UOP's Pacol process uses heterogeneous catalyst to convert C6-C19 n-paraffins into associated olefins, which have mixed positions of unsaturated bonds, such that the olefin contain internal and terminal olefins. Catalytic processes are very expensive.

Non-catalytic processes include thermal cracking of residue or crude oils. Thermal cracking methods generally subject C20-C30 range hydrocarbons, including waxes, to temperatures in the range between 500 deg C. and 600 deg C. in the presence of steam at normal or slightly elevated pressure and at residence times between 7 seconds and 15 seconds which results in cracking. Conversion in thermal cracking processes is about 25% and the product is 90-95% α-olefins. When waxes are the feed, the product can contain a wide range α-olefins, some of which have limited usefulness in industry. α-olefins produced from crude oils are not readily or economically separable from other components such as n-paraffins and aromatics that are also produced due to the complicated compositions and interaction between components.

Reactions in supercritical water can produce significant amounts of α-olefins. Alkyl radicals, including alkyl aromatic radicals, formed under thermolysis conditions, can undergo propagation by two paths: hydrogen abstraction and beta-scission. Hydrogen abstraction takes hydrogen from other compounds and the alkyl radicals are converted to alkanes. Alpha-olefins can be formed through beta-scission, where the alkyl radical cracks to produce an alkyl radical and an α-olefin. Beta-scission does not require additional molecules. Hydrogen abstraction reactions are suppressed in supercritical water reactions due to the dilution effect of the supercritical water, making it difficult to find hydrogen donor compounds. In contrast, beta-scission of alkyl radical is increased under supercritical water conditions because such donor compounds are not required. Thus, under supercritical water conditions, more α-olefins tend to be formed than under conventional thermal cracking conditions. However, α-olefins are unstable under thermolysis conditions, as compared to alkanes, and can be cracked to form radicals that participate in additional reactions. Isomerization of α-olefins to produce inner olefins, that is olefins where the double bond is at a position other than alpha, through hydrogen abstraction is suppressed due to the dilution effect of supercritical water. For this reason, product oil produced in the presence of supercritical conditions treatment contains significant amounts of α-olefins with minor amounts of internal olefins. But, such α-olefins can produce aromatic compounds through radical-mediated cyclization, which is also augmented due to suppressed hydrogen abstraction from dilution of the α-olefin radicals.

In addition to being difficult to separate from the other fractions, such as paraffins and aromatics, in an upgraded oil, α-olefins can make the upgraded oil unstable. In fact, olefins in general reduce stability of petroleum-based oil, such as gasoline, diesel, and fuel oil, because those can form gums through oxidation reactions with air. Thus, to improve stability of product oil from supercritical water treatment, α-olefins must be converted to more stable chemicals. For example, one way to improve stability, is for olefins to be saturated by hydrotreating processes. However, hydrotreating processes need additional units and hydrogen supply along with catalyst. Thus, a way to reduce olefin content from the upgraded oil in the absence of hydrotreating is desired. Thermolysis of 1-olefins produces aromatic compounds through radical-mediated cyclization and such cyclization is enhanced by dilution of radicals. Additionally greater temperatures are preferred for aromatization.

SUMMARY

Disclosed are methods for upgrading hydrocarbons. Specifically, disclosed are methods and systems for producing 1-olefins as part of a process for upgrading hydrocarbons.

In a first aspect, a process for producing olefins is provided. The process includes the steps of introducing a liquid oil from a supercritical unit to a fractionator, the fractionator configured to separate the liquid oil, separating the liquid oil in the fractionator to produce a light oil product and a heavy oil product, introducing the light oil product to an extractor, the extractor configured to separate the light oil product, separating the light oil product in the extractor to produce a paraffin fraction stream, an olefin product, and an aromatic product, where the olefin product includes 1-olefins, where the aromatic product includes aromatics and naphthalenes, where the paraffin fraction stream includes short chain paraffins, increasing a pressure of the paraffin fraction stream in a paraffin pump to produce a pressurized paraffin stream, introducing the pressurized paraffin stream to a water mixer, the water mixer configured to mix a hydrocarbon stream and a water stream, mixing the pressurized paraffin stream with a pressurized water feed in the water mixer to produce a paraffin-containing water stream, where a pressure of the paraffin-containing water stream is greater than the critical pressure of water, introducing the paraffin-containing water stream to a water heater, the water heater configured to heat the paraffin-containing water stream, heating the paraffin-containing water stream in the water heater to produce a hot paraffin-water stream, where a temperature of the hot paraffin-water stream is greater than 450 deg C., where a residence time in the water heater is between 10 seconds and 10 minutes, where the short chain paraffins in the hot paraffin-water stream are operable to crack at the temperature of the hot paraffin-water stream such that hot paraffin-water stream includes 1-olefins, introducing the hot paraffin-water stream to a feed mixer, introducing a hot feedstock to the feed mixer, where the hot feedstock includes hydrocarbons, mixing the hot paraffin-water stream and the hot feedstock in the feed mixer to produce a mixed feed stream, and introducing the mixed feed stream to the supercritical unit.

In certain aspects, the process further includes the steps of introducing a water feed to a water pump, the water pump configured to increase a pressure of the water feed, and increasing the pressure of the water feed to produce the pressurized water feed, where the pressure of the water feed is greater than the critical pressure of water. In certain aspects, the process further includes the steps of introducing a residue feedstock to a residue pump, the residue pump configured to increase a pressure of the residue feedstock, increasing the pressure of the residue feedstock to produce a high pressure feedstock, where the pressure of the high pressure feedstock is greater than the critical pressure of water, introducing the high pressure feedstock to a residue heater, the residue heater configured to increase a temperature of the high pressure feedstock, and increasing the temperature of the high pressure feedstock to produce the hot feedstock, where the hot feedstock is a temperature between 30 deg C. and 150 deg C. In certain aspects, the process further includes the steps of introducing the mixed feed stream to a reactor of the supercritical unit, the reactor configured to treat the mixed feed stream, where the mixed feed stream includes water, paraffins, and residue-containing hydrocarbons, reacting the mixed feed stream in the reactor to produce a reactor effluent stream, where the reactor effluent stream includes 1-olefins and upgraded hydrocarbons such that the upgraded hydrocarbons are upgraded relative to the hydrocarbons in the hot feedstock, introducing the reactor effluent stream to a heat exchanger, the heat exchanger configured to reduce a temperature of the reactor effluent stream, reducing the temperature of the reactor effluent stream in the heat exchanger to produce a cooled effluent, introducing the cooled stream to a letdown device, the letdown device configured to reduce a pressure of the cooled effluent, reducing the pressure of the cooled effluent in the letdown device to produce a depressurized stream, introducing the depressurized stream to a gas-liquid separator, the gas-liquid separator configured to separate gases from the depressurized stream, separating the depressurized stream in the gas-liquid separator to produce a gas product and a liquid phase, introducing liquid phase to an oil-water separator, the oil-water separator configured to separate water from the liquid phase, and separating the liquid phase in the oil-water separator to produce the liquid oil and a water product. In certain aspects, a temperature in the reactor is between 380 and 450 deg C. In certain aspects, a temperature of the hot paraffin-water stream is between 500 deg C. and 550 deg C. In certain aspects, a ratio of the volumetric flow rate of the residue feedstock to the water feed at standard atmospheric temperature and pressure is between 1:2 to 1:4.

In a second aspect, a system for producing olefins is provided. The system includes a fractionator fluidly connected to a supercritical unit, the fractionator configured to separate a liquid oil into a light oil product and a heavy oil product, an extractor fluidly connected to the fractionator, the extractor configured to separate the light oil product to produce a paraffin fraction stream, an olefin product, and an aromatic product, where the olefin product includes 1-olefins, where the aromatic product includes aromatics and naphthalenes, where the paraffin fraction stream includes short chain paraffins, a paraffin pump fluidly connected to the extractor, the paraffin pump configured to increase a pressure of the paraffin fraction stream to produce a pressurized paraffin stream, a water mixer fluidly connected to the paraffin pump and a water pump, the water mixer configured to mix the pressurized paraffin stream and a pressurized water feed to produce a paraffin-containing water stream, where a pressure of the paraffin-containing water stream is greater than the critical pressure of water, a water heater fluidly connected to the water mixer, the water heater configured to heat the paraffin-containing water stream to produce a hot paraffin-water stream, where a temperature of the hot paraffin-water stream is greater than 450 deg C., where a residence time in the water heater is between 10 seconds and 10 minutes, where the short chain paraffins in the hot paraffin-water stream are operable to crack at the temperature of the hot paraffin-water stream such that hot paraffin-water stream includes 1-olefins, a feed mixer fluidly connected to a water heater and a residue heater, the feed mixer configured to mix the hot paraffin-water stream and a hot feedstock to produce a mixed feed stream, and the supercritical unit fluidly connected to the feed mixer, the supercritical unit configured to treat the mixed feed stream to produce the liquid oil.

In certain aspects, the system further includes a water pump, the water pump configured to increase a pressure of a water feed to produce the pressurized water feed, where the pressure of the water feed is greater than the critical pressure of water. In certain aspects, the system further includes a residue pump, the residue pump configured to increase a pressure of a residue feedstock to produce a high pressure feedstock, where the pressure of the high pressure feedstock is greater than the critical pressure of water, and a residue heater fluidly connected to the residue pump, the residue heater configured to increase a temperature of the high pressure feedstock to produce the hot feedstock, where the hot feedstock is a temperature between 30 deg C. and 150 deg C. In certain aspects, the supercritical unit includes a reactor, the reactor configured to treat the mixed feed stream, where the mixed feed stream includes n-paraffins, water, residue-containing hydrocarbons, and combinations of the same to produce a reactor effluent stream, where the reactor effluent stream includes 1-olefins and upgraded hydrocarbons such that the upgraded hydrocarbons are upgraded relative to the hydrocarbons in the hot feedstock, a heat exchanger fluidly connected to the reactor, the heat exchanger configured to reduce a temperature of the reactor effluent stream to produce a cooled effluent, a letdown device fluidly connected to the heat exchanger, the letdown device configured to reduce a pressure of the cooled effluent to produce a depressurized stream, a gas-liquid separator fluidly connected to the letdown device, the gas-liquid separator configured to separate gases from the depressurized stream to produce a gas product and a liquid phase, and an oil-water separator fluidly connected to the gas-liquid separator, the oil-water separator configured to separate water from the liquid phase to produce the liquid oil and a water product. In certain aspects, the fractionator is a distillation column. In certain aspects, the water mixer is selected from the group consisting of a static mixer, a CSTR-type mixer, an ultrasonic-type mixer, and combinations of the same. In certain aspects, the reactor is selected from a tubular-type reactor, a vessel-type reactor, and a combination of the same.

In a third aspect, a process for producing olefins is provided. The process including the steps of introducing a liquid oil from a supercritical unit to a fractionator, the fractionator configured to separate the liquid oil, separating the liquid oil in the fractionator to produce a light oil product and a heavy oil product, introducing the light oil product to an extractor, the extractor configured to separate the light oil product, separating the light oil product in the extractor to produce a paraffin fraction stream, an olefin product, and an aromatic product, where the olefin product includes 1-olefins, where the aromatic product includes aromatics and naphthalenes, where the paraffin fraction stream includes short chain paraffins, increasing a pressure of the paraffin fraction stream in a paraffin pump to produce a pressurized paraffin stream, introducing the pressurized paraffin stream to a water mixer, the water mixer configured to mix a hydrocarbon stream and a water stream, mixing the pressurized paraffin stream with a pre-heated water in the water mixer to produce a pre-heated paraffin-water stream, where a pressure of the pre-heated paraffin-water stream is greater than the critical pressure of water, where a temperature of the pre-heated paraffin-water stream is less than the critical temperature of water, introducing the pre-heated paraffin-water stream to a water heater, the water heater configured to heat the pre-heated paraffin-water stream, heating the pre-heated paraffin-water stream in the water heater to produce a hot paraffin-water stream, where a temperature of the hot paraffin-water stream is greater than 450 deg C., where a residence time in the water heater is between 10 seconds and 10 minutes, where the short chain paraffins in the hot paraffin-water stream are operable to crack at the temperature of the hot paraffin-water stream such that hot paraffin-water stream includes 1-olefins, introducing the hot paraffin-water stream to a feed mixer, introducing a hot feedstock to the feed mixer, where the hot feedstock includes hydrocarbons, mixing the hot paraffin-water stream and the hot feedstock in the feed mixer to produce a mixed feed stream, and introducing the mixed feed stream to the supercritical unit.

In certain aspects, the process further includes the steps of introducing a water feed to a water pump, the water pump configured to increase a pressure of the water feed, increasing the pressure of the water feed to produce the pressurized water feed, where the pressure of the water feed is greater than the critical pressure of water, introducing the pressurized water feed to a pre-heater, the pre-heater configured to increase a temperature of the pressurized water feed to produce a pre-heated water, and increasing a temperature of the pressurized water feed to produce the pre-heated water.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

DETAILED DESCRIPTION

Figure 1:
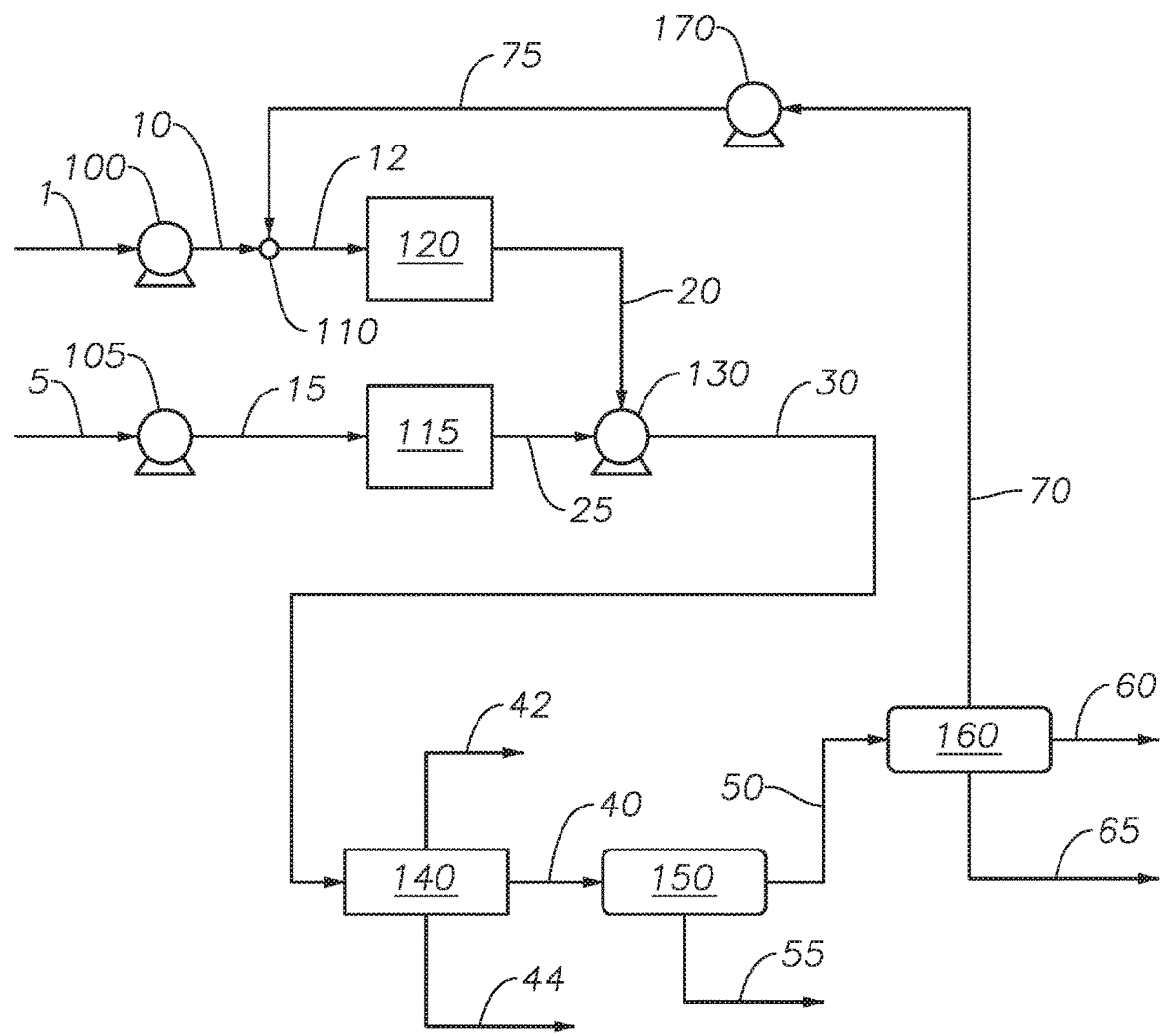
FIG. 1 provides a process diagram of an embodiment of the process.

While the scope will be described with several embodiments, it is understood that one of ordinary skill in the relevant art will appreciate that many examples, variations and alterations to the apparatus and methods described here are within the scope and spirit. Accordingly, the embodiments described are set forth without any loss of generality, and without imposing limitations, on the embodiments. Those of skill in the art understand that the scope includes all possible combinations and uses of particular features described in the specification.

Described here are processes and systems for producing 1-olefins in a supercritical water process. Advantageously, the use of supercritical water as a reaction medium produces 1-olefins from paraffins and alkyl aromatics while reducing or eliminating further reaction of the 1-olefins. An integrated hydrothermal process can combine a supercritical water process and a subcritical water process. Advantageously, the addition of the subcritical water process provides an integrated system through which the unconverted hydrocarbons from the supercritical water process can be converted. An integrated hydrothermal process improves energy efficiency while minimizing complexity of the system. Advantageously, the milder conditions of the subcritical water process as compared to the supercritical water process allow a catalyst to be used in the subcritical water process.

As used throughout, "external supply of hydrogen" refers to hydrogen, in gas ($H_2$) or liquid form, supplied as a feed or part of a feed to a unit in the system. External supply of hydrogen does not encompass hydrogen present in the petroleum feedstock.

As used throughout, "external supply of catalyst" refers to a catalyst added to a unit as either a part of the feed to the unit or present in the empty unit, for example as a catalyst bed. External supply of catalyst does not encompass compounds that could have a catalytic effect and are part of the petroleum feedstock or produced through reactions within the units of the system.

As used throughout, "in the absence of" means does not contain, does not include, does not comprise, is without, or does not occur.

As used throughout, "1-olefins," "alpha-olefins," "alpha olefins" or "α-olefins" refers to alkenes having a chemical formula of $C_xH_{2x}$, with a double bond at the alpha position. Alpha-olefins can include branched and linear compounds.

As used throughout, "heavy fraction" refers to the fraction in a hydrocarbon fluid having a True Boiling Point 10 percent (TBP 10%) that is greater than 650 degrees Fahrenheit (deg F.) (343 deg C.), and alternately greater than 1050 deg F. (566 deg C.). The heavy fraction can include components from a petroleum feed that were not converted in the supercritical water reactor. The heavy fraction can also include hydrocarbons that were dimerized or oligomerized in the supercritical water reactor.

As used throughout, "light fraction" refers to the fraction that remains of a hydrocarbon fluid after the light gases and heavy fraction are removed. TBP 90% of the light fraction is less than 650 deg F. and alternately less than 1050 deg F.

As used throughout, "light gases" refers to hydrocarbon gases containing five or fewer carbon atoms (C5−).

The boiling point ranges of the light gases, the light fraction and the heavy fraction can depend on the target properties of the products, such as the concentration of unsaturated hydrocarbons in the product or the viscosity. For example, if the light fraction can be a valuable product even when it contains amounts of unsaturated hydrocarbons, then the heavy fraction can have a TBP 10% greater than 1050 deg F. so as to increase the quantity of the light fraction while reducing the load on the heavy fraction processing unit when used. For example, if the heavy fraction is to be used as a low viscosity fuel oil, the heavy fraction can have a TBP 10% greater than 650 deg F.

As used throughout, "coke" refers to the toluene insoluble material present in petroleum.

As used throughout, "upgrade" means to increase the API gravity, decrease the amount of impurities, such as sulfur, nitrogen, and metals, decrease the amount of asphaltene and increase the amount of the light fraction.

It is known in the art that hydrocarbon reactions in supercritical water upgrade heavy oil to produce products that have lighter fractions. Supercritical water has unique properties making it suitable for use as a petroleum reaction medium where the reaction objectives include upgrading reactions, desulfurization reactions and demetallization reactions, where supercritical water acts as both a hydrogen source and a solvent (diluent). Supercritical water is water greater than the critical temperature of water and greater than the critical pressure of water. The critical temperature of water is 373.946 deg C. The critical pressure of water is 22.06 megapascals (MPa). Without being bound to a particular theory, it is understood that the basic reaction mechanism of supercritical water mediated petroleum processes is the same as a radical reaction mechanism. Thermal energy creates radicals through chemical bond breakage. Supercritical water, acting as a diluent, creates a "cage effect" by surrounding radicals. The radicals surrounded by water molecules cannot react easily with each other, and thus, intermolecular reactions that contribute to coke formation are suppressed. The cage effect suppresses coke formation by limiting inter-radical reactions compared to conventional thermal cracking processes, such as delayed coker. Hydrogen from the water molecules can be transferred to the hydrocarbons through direct transfer or through indirect transfer, such as the water gas shift reaction, although the amount of hydrogen produced from the water gas shift reaction is quite low. While, supercritical water can be a source of hydrogen, it is inevitable to produce unsaturated hydrocarbons due to the limited amount of available hydrogen. Unsaturated carbon-carbon bonds can be distributed through the whole range of boiling points. However, at temperatures greater than 450 deg C. the dilution effect of the supercritical water is overwhelmed and coke formation occurs.

The process and system to produce linear olefins can be understood with reference to FIG. 1. Residue feedstock 5 is transferred to residue heater 115 through residue pump 105. Residue feedstock 5 can be any source of feedstock oil, including residue-containing hydrocarbons. Examples of feedstock oil sources include whole range crude oil, distilled crude oil, residue oil, topped crude oil, product stream from oil refineries, product streams from steam cracking processes, liquefied coals, liquid products recovered from oil or tar sands, bitumen, oil shale, asphaltene, biomass hydrocarbons, liquid product from Gas-to-Liquid (GTL) processes, and combinations of the same. In at least one embodiment, residue feedstock 5 is selected from deasphalted oil produced from a solvent deasphalting process of atmospheric residue or vacuum residue, heavy vacuum gas oil, bottom fractions from a hydrocracker product, and combinations of the same. The source of residue feedstock 5 is selected such that the API gravity is less than 41 and the aromaticity is less than 0.2. Aromaticity can be measured by Proton NMR(fa). A residue feedstock having an aromaticity less than 0.2 increases the formation of 1-olefins from paraffins and alkyl chains, which would be decreased by the presence of aromatics. Examples of residue-containing hydrocarbons includes n-paraffins, iso-paraffins, alkylaromatics, naphthenes, asphaltenes, and other hydrocarbons.

Residue pump 105 increases the pressure of residue feedstock 5 to produce high pressure feedstock 15. Residue pump 105 can be any type of pump capable of increasing the pressure of residue feedstock 5. Examples of residue pump 105 include a diaphragm metering pump. The pressure of high pressure feedstock 15 is a pressure greater than the critical pressure of water, alternately greater than about 23 MPa, and alternately between about 23 MPa and about 30 MPa. In at least one embodiment, the pressure is about 24 MPa.

Residue heater 115 increases the temperature of high pressure feedstock 15 to produce hot feedstock 25. Residue heater 115 can be any type of heating device that can increase the temperature of high pressure feedstock 15. Examples of residue heater 115 can include an electric heater, a gas-fired heater, a steam heater, and a heat exchanger. Residue heater 115 heats high pressure feedstock 15 to a temperature. The temperature of hot feedstock 25 is at temperature equal to or less than 250 deg C., alternately a temperature less than 200 deg C., alternately a temperature between about 30 deg C. and 250 deg C., alternately a temperature less than 150 deg C., alternately a temperature between 30 deg C. and 150 deg C., and alternately a temperature between 50 deg C. and 150 deg C. In at least one embodiment, the temperature is 150 deg C. In at least one embodiment, maintaining the temperature of hot feedstock 25 at or less than about 150 deg C. eliminates the production of coke in hot feedstock 25. Additionally, heating an residue oil stream to greater than 250 deg C., while possible, requires heavy heating equipment, whereas heating to 150 deg C. can be accomplished using steam in a heat exchanger.

Water feed 1 is fed to water pump 100 to create pressurized water feed 10. Water feed 1 is demineralized water with a conductivity, a sodium content, a chloride content, and a silica content. The conductivity of water feed 1 can be less than 1.0 micro Siemens per centimeter (μS/cm), alternately less than 0.5 micro Siemens per centimeter (μS/cm), and alternately less than 0.1 μS/cm. The sodium content of water feed 1 can be less than 5 micrograms per liter (μg/l) and alternately less than 1 μg/l. The chloride content of water feed 1 can be less than 5 μg/l and alternately less than 1 μg/l. The silica content can be less than 3 μg/l. Water pump 100 can be any type of pump capable of increasing the pressure of water feed 1. Examples of pumps suitable for use as water pump 100 include a diaphragm metering pump. Pressurized water feed 10 has a pressure. The pressure of pressurized water feed 10 is greater than the critical pressure of water, alternately a pressure greater than about 23 MPa, and alternately a pressure between about 23 MPa and about 30 MPa. In at least one embodiment, the pressure of pressurized water feed 10 is about 24 MPa. Pressurized water feed 10 is fed to water mixer 110.

Pressurized water feed 10 can be mixed with pressurized paraffin stream 75 in water mixer 110 to produce paraffin-containing water stream 12. Water mixer 110 can be any type of mixer capable of mixing a hydrocarbon stream and a water stream. Water mixer 110 includes a mixing element. Examples of water mixer 110 include static mixer, CSTR-type mixer, ultrasonic-type mixer, and combinations of the same. Paraffin-containing water stream 12 can be introduced to water heater 120.

Water heater 120 heats paraffin-containing water stream 12 to a temperature to produce hot paraffin-water stream 20. Water heater 120 can be any type of heating device that can increase the temperature of paraffin-containing water stream 12. Examples of water heater 120 can include a gas-fired heater, an electric heater, and a heat exchanger. The temperature of hot paraffin-water stream 20 is a temperature greater than 450 deg C., alternately between 450 deg C. and 600 deg C., alternately between 450 deg C. and 550 deg C., alternately between 450 deg C. and 500 deg C., and alternately between 500 deg C. and 550 deg C. In at least one embodiment, the temperature of hot paraffin-water stream 20 is greater than 450 deg C. In at least one embodiment, the temperature of hot paraffin-water stream 20 is between 500 deg C. and 550 deg C. Hot paraffin-water stream 20 is at supercritical water conditions. The upper limit of the temperature is constrained by the rating of the physical aspects of the process, such as pipes, flanges, and other connection pieces. For example, for 316 stainless steel, the maximum temperature at high pressure is recommended to be 649 deg C. Temperatures less than 600 deg C. are practical within the physical constraints of the pipelines. The internal volume of water heater 120 can be designed such that the residence time of paraffin-containing water stream 20 is between 10 seconds and 10 minutes and alternately between 30 seconds and 2 minutes. Residence time in water heater 120 is calculated by assuming the fluid has the density of water at the internal conditions of water heater 120.

Short chain paraffins present in paraffin-containing water stream 12 can begin cracking in water heater 120, such that the composition of hot paraffin-water stream 20 contains a different mix of paraffins compared to paraffin-containing water stream 12. Heating paraffins directly to temperatures greater than the supercritical point of water will generate light gases and aromatics with only trace amounts of alpha olefins. Advantageously, the supercritical water in the paraffin-containing water stream suppresses the production of light gases and aromatics and increases the production of 1-olefins in the hot paraffin-water stream. Additionally, recycling the pressurized paraffin stream through the reactor of the supercritical unit increases the amount of 1-olefins in the product stream. Advantageously, recycling the pressurized paraffin stream through the supercritical reactor can result in increased upgrading of the asphaltenic fraction of the residue feedstock because paraffins act as a hydrogen donor and thus the paraffins in the paraffin-containing water stream can increase the amount of hydrogen available in the reactor of the supercritical unit.

Water feed 1 and residue feedstock 5 are pressurized and heated separately. In at least one embodiment, the temperature difference between hot feedstock 25 and hot paraffin-water stream 20 is greater than 300 deg C. Without being bound to a particular theory, a temperature difference between hot feedstock 25 and hot paraffin-water stream 20 of greater than 300 deg C. is believed to increase the mixing of the hydrocarbons present in hot feedstock 25 with the supercritical water in hot paraffin-water stream 20 in feed mixer 130. Hot paraffin-water stream 20 is in the absence of an oxidizing agent. Regardless of the order of mixing, the residue-containing hydrocarbons in residue feedstock 5 are not heated to a temperature greater than 350 deg C. until after having been mixed with water from water feed 1 to avoid the production of coke.

Hot paraffin-water stream 20 and hot feedstock 25 are fed to feed mixer 130 to produce mixed feed stream 30. Feed mixer 130 can include any mixer capable of mixing a petroleum-based hydrocarbon stream and a supercritical water stream. Examples of mixers for feed mixer 130 include static mixers, mixer with internal agitator, tee fittings, ultrasonic mixers, and capillary mixers. Without being bound to a particular theory, supercritical water and hydrocarbons do not instantaneously mix on contact, but require sustained mixing before a well-mixed or thoroughly mixed stream can be developed. A well-mixed stream facilitates the cage-effect of the supercritical water on the hydrocarbons. The ratio of the volumetric flow rates of residue-containing hydrocarbons to water feed in mixed feed stream 30 at standard ambient temperature and pressure (SATP) is between about 1:1.01 and about 1:10, and alternately between about 1:2 and 1:4. The amount of water in mixed feed stream 30 is greater than the amount of hydrocarbons, including hydrocarbons in both the residue feedstock and the pressurized paraffin stream. Advantageously, maintaining an amount of water greater than the amount of hydrocarbons can hinder intermolecular reactions and specifically hinder the ability of 1-olefins to react with other 1-olefins. In at least one embodiment, the ratio of the volumetric flow rate of water to the volumetric flow rate of residue-containing hydrocarbons entering supercritical unit 140 is in the range of 2:1 to 4:1 at SATP. Maintaining a ratio of the volumetric flow rate of water to the volumetric flow rate of the residue-containing hydrocarbons of greater than 1 can dilute 1-olefins in reactor 142 which reduces the production of aromatics from the 1-olefins.

Having a well-mixed mixed feed stream 30 can increase the conversion of hydrocarbons in the reactor of supercritical unit 140. The temperature of mixed feed stream 30 depends on the temperature of hot paraffin-water stream 20, the temperature of hot feedstock 25, and the ratio of hot paraffin-water stream 20 to hot feedstock 25. The temperature of mixed feed stream 30 can be between 270 deg C. and 450 deg C., alternately between 300 deg C. and 450 deg C., and alternately between 380 deg C. and 450 deg C. In at least one embodiment, the temperature of mixed feed stream 30 is greater than 300 deg C. The pressure of mixed feed stream 30 depends on the pressure of hot paraffin-water stream 20 and the pressure of hot feedstock 25. The pressure of mixed feed stream 30 can be greater than 22 MPa. The paraffins in mixed feed stream 30 do not act as a diluent for hydrocarbons in mixed feed stream 30, unlike supercritical water which does act as a diluent.

Mixed feed stream 30 contains n-paraffins, water, residue-containing hydrocarbons, and combinations of the same.

Mixed feed stream 30 can be introduced to supercritical unit 140. In at least one embodiment, mixed feed stream 30 passes from feed mixer 130 to supercritical unit 140 in the absence of an additional heating step. In at least embodiment, mixed feed stream 30 passes from feed mixer 130 to supercritical unit 140 in the absence of an additional heating step, but through piping with thermal insulation to maintain the temperature or minimize temperature drop through the piping.

Mixed feed stream 30 can be treated in supercritical unit 140 to produce liquid oil 40, gas product 42, and water product 44. Supercritical unit 140 can be understood with reference to FIG. 2

Reactor 142 can include one or more reactors in series. Reactor 142 can be a tubular-type reactor, a vessel-type reactor, and a combination. Reactor 142 can be oriented horizontally, vertically, sloped (at an angle from horizontal or vertical), and a combination of the same. In vertical reactors, flow direction can be upflow, downflow, and combinations of the same. In at least one embodiment, reactor 142 is a tubular-type reactor. In at least one embodiment, reactor 142 is a tubular-type reactor oriented vertically. In at least one embodiment, reactor 142 is a tubular-type reactor oriented vertically with a downflow flow direction.

Reactor 142 is operated at a temperature greater than the critical temperature of water, alternately between about 374 deg C. and about 500 deg C., alternately between about 380 deg C. and about 450 deg C., alternately between 430 deg C. and 450 deg C., and alternately between about 420 deg C. and about 440 deg C. In at least one embodiment, the temperature in reactor 142 is between 420 deg C. and about 440 deg C. In at least one embodiment, the temperature in reactor 142 is between 430 deg C. and 450 deg C. The temperature in reactor 142 can be maintained by an external heater, an internal heater, and combinations of the same. Examples of external heaters can include electric heater and fired heater. Reactor 142 can be surrounded by a layer of insulation. In at least one embodiment, reactor 142 is in the absence of an external heater and only a layer of insulation is used to maintain the temperature in reactor 142. Maintaining a temperature of less than 450 deg C. can prevent the reaction of 1-olefins into other products.

The internal volume of reactor 142 can be designed to have a residence time of internal fluid in the range of 30 seconds to 60 minutes and alternately between 1 minute and 5 minutes. In at least one embodiment, the residence time is between 1 minute and 5 minutes. Residence time is calculated by assuming the density of the internal fluid is the same as the density of water at the temperature and pressure conditions in the reactor. For at least two-thirds (⅔) of the residence time of the fluid in reactor 142, the temperature is maintained in isothermal condition. Isothermal condition means that the temperature difference through the reactor is within 5 degrees (+/−5 degrees) of the beginning and alternately within 2.5 degrees (+/−2.5 degrees). If the residence time is measured based on length of reactor, for example, then for a reactor that is 12 meters long, then at least 8 meters is in isothermal condition. If the residence time is based on duration in the reactor, then if the internal fluid is within the reactor for 150 seconds, then the internal fluid is exposed to isothermal condition for at least 100 seconds. Maintaining the internal fluid at isothermal conditions for at least ⅔ of the residence time is critical to prevent gradual heating that can cause secondary reaction of 1-olefins like aromatization and isomerization.

Reactor 142 is at a pressure greater than the critical pressure of water, alternately greater than about 220 bar (22 MPa) to 300 bar (30 MPa), alternately between 250 bar (25 MPa) and 280 bar (28 MPa).

Conversion reactions can occur in reactor 142 to produce reactor effluent stream 32. Exemplary conversion reactions include cracking, isomerization, alkylation, dimerization, aromatization, cyclization, desulfurization, denitrogenation, demetallization, and combinations thereof. Reactor 142 is in the absence of an external supply of hydrogen and in the absence of an external supply of catalyst.

The cage effect of supercritical water in reactor 142 can suppress secondary reactions of the linear 1-olefins formed in water heater 120, such secondary reactions can include isomerization, dimerization and cyclization. Long chain paraffins present from residue feedstock 5 can be cracked to produce 1-olefins and short chain paraffins. Additionally, alkyl aromatic compounds present in residue feedstock 5 can be cracked through beta scission to produce 1-olefins and aromatics. Reactor effluent stream 32 can include upgraded hydrocarbons, 1-olefins, and water. The upgraded hydrocarbons in reactor effluent stream 32 can include light gases, heavy fractions and light fractions.

Reactor effluent stream 32 can be fed to heat exchanger 144 to produce cooled stream 34. Heat exchanger 144 can be any device capable of reducing the temperature of reactor effluent stream 32. In at least one embodiment, heat exchanger 144 is a heat exchanger. The temperature of cooled stream 34 can depend on the operating conditions desired for gas-liquid separator 146. The temperature of cooled stream 34 can be in the range between 50 deg C. and 350 deg C., alternately less than 374 deg C., alternately in the range between 50 deg C. and 120 deg C., and alternately less than 120 deg C. In at least one embodiment the temperature of cooled stream 34 is less than 120 deg C.

Cooled stream 34 passes through letdown device 145 to produce depressurized stream 36. Letdown device 145 can be any pressure regulating device capable of reducing fluid pressure. Examples of pressure regulating devices that can be used as letdown device 145 include pressure control valves, capillary elements, back pressure regulators, and combinations of the same. Letdown device 145 can be two or more pressure regulating devices in series. In at least one embodiment, letdown device 145 can be a back pressure regulator. Letdown device 145 reduces the pressure of cooled stream 34 to a pressure between 2 bar (0.2 MPa) and 50 bar (5 MPa) and alternately between 10 bar (1 MPa) and 20 bar (2 MPa).

Depressurized stream 36 is fed to gas-liquid separator 146. Gas-liquid separator 146 separates depressurized stream 36 into gas product 42 and liquid phase 38. Gas-liquid separator 146 can be a simple fractionator, such as a flash drum. Advantageously, the temperature and pressure of depressurized stream 36 are such that a flash drum can be used to separate depressurized stream 36 into the gas phase and liquid phase. Gas-liquid separator 146 can be designed to generate vapor inside. Gas product 42 includes hydrogen, light gases, hydrogen sulfide, water vapor, and combinations of the same. Liquid phase 38 includes light fractions, heavy fractions, water, and combinations of the same. The composition, including the hydrocarbon composition and the amount of water, of each of gas product 42 and liquid phase 38 depends on the temperature and pressure in gas-liquid separator 146. The temperature and pressure of gas-liquid separator 146 can be adjusted to achieve the desired separation between gas product 42 and liquid phase 38. In at least one embodiment, gas product 42 is in the absence of hydrocarbons with six or more carbon atoms (C6+ hydrocarbons). In at least one embodiment, the operating conditions in gas-liquid separator 146 can be adjusted such that the light gases in gas product 42 contains four or fewer carbon atoms (C4− hydrocarbons) to maximize the amount of hydrocarbons in liquid phase 38.

Liquid phase 38 can be introduced to oil-water separator 148. Oil-water separator 148 can separate liquid phase 38 into liquid oil 40 and water product 44. Liquid oil 40 can include the upgraded hydrocarbons, the 1-olefins, and the short chain paraffins from reactor effluent stream 32. Liquid oil 40 can contain less than 0.3 wt % water to increase the efficiency of separation in extractor 160. Water product 44 can be treated to remove solid materials and inorganic species and recycled to use as a source for water feed 1. In at least one embodiment, a demulsifier can be added to oil-water separator 148 to enhance separation. The demulsifier can be added at a concentration of between 400 wt ppm and 600 wt ppm.

Figure 2:
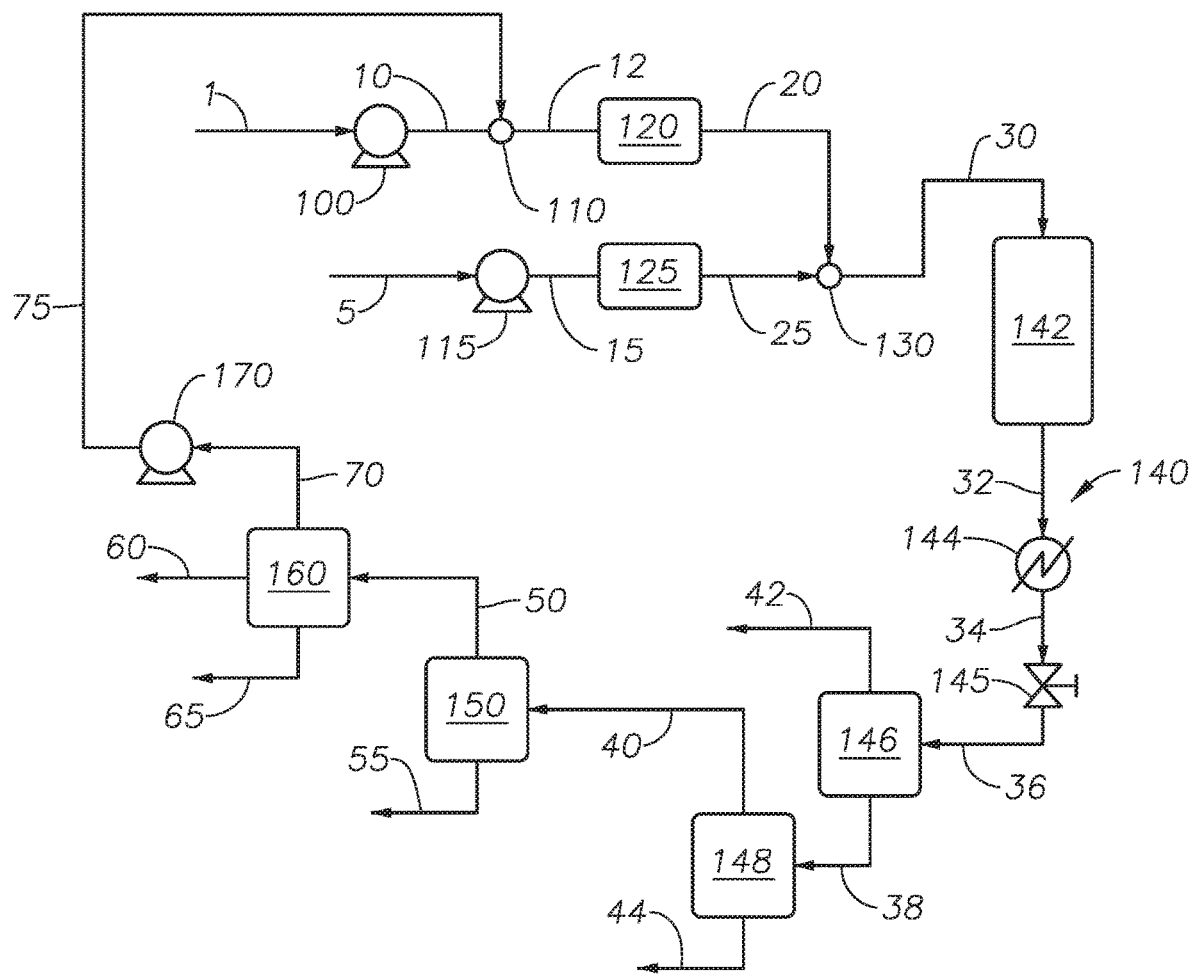
FIG. 2 provides a process diagram of an embodiment of the process.

Returning to FIG. 1 and as shown in FIG. 2, liquid oil 40 can be introduced to fractionator 150. Liquid oil 40 can be separated in fractionator 150 to produce light oil product 50 and heavy oil product 55. Fractionator 150 can be any type of separation unit capable of separating a hydrocarbon based on boiling point. In at least one embodiment, fractionator 150 is a distillation column. The conditions in fractionator 150 can be designed to achieve light oil product 50 that has a T90% less than 340 deg C. and alternately less than 290 deg C. Heavy oil product 55 can be the distillation residue. Heavy oil product 55 can contain less than 0.3 wt % water in order to meet specifications for use of heavy oil product 55 as a fuel oil or other refined product. In at least one embodiment, only light oil product 50 and heavy oil product 55 are produced in fractionator 150.

Light oil product 50 can be introduced to extractor 160. Extractor 160 can be any type of separation unit capable of separating hydrocarbon fractions. An example of an extractor suitable for use as extractor 160 can be found in U.S. Pat. No. 6,211,423. Light oil product 50 can be separated in extractor 160 to produce paraffin fraction stream 70, olefin product 60, and aromatic product 65. Olefin product 60 can contain the olefin fraction, including 1-olefins. Aromatic product 65 can contain aromatics and naphthalenes. In at least one embodiment, light aromatic product 65 can be combined with heavy oil product 55 to produce a product stream that can be used as fuel oil.

Paraffin fraction stream 70 can contain the paraffin fraction, including short chain paraffins. Short chain paraffins, such as the paraffins in paraffin fraction stream 70, have 20 or fewer carbon atoms (C20−) and alternately 16 or fewer carbon atoms (C16−). The paraffins in paraffin fraction 70 have boiling points less than 340 deg C. and alternately less than 290 deg C. Paraffin fraction stream 70 can be recycled and mixed with water feed 1. Paraffin fraction stream 70 can be mixed with water feed 1 upstream of water pump 100 (not shown) or downstream of water pump 100. In at least one embodiment, paraffin fraction stream 70 is introduced downstream of water pump 100 and is introduced to paraffin pump 170 to increase the pressure to allow mixing in water mixer 110. Paraffin pump 170 can be any type of pump capable of increasing the pressure of paraffin fraction stream 70 to produce pressurized paraffin stream 75. Pressurized paraffin stream 75 can be introduced to water mixer 110.

Advantageously, recycling paraffin fraction stream 70 increases the amount of olefins produced. Long chain paraffins, paraffins with 20 or more carbon atoms (C20+) and alternately 16 or more carbon atoms (C16+) present in residue feedstock 5 possess higher activity compared to short chain paraffins and can be cracked at temperatures less than 450 deg C. Long chain paraffins can be cracked to produce 1-olefins and short chain paraffins. Cracking of long chain paraffins can occur in the reactor of supercritical unit 140. Short chain paraffins require temperatures greater than 450 deg C. to crack. In the first pass through supercritical unit 140 minimal amounts of short chain paraffins will be cracked due to relatively lower temperature in the reactor of supercritical unit 140 compared to the temperature in water heater 120. Recycling paraffin fraction stream 70 increases the amount of short chain paraffins that are cracked by exposing the short chain paraffins to temperatures greater than 450 deg C. in water heater 120. Recycling the paraffin fraction in paraffin fraction stream 70 can increase the amount of 1-olefins produced. The short chain paraffins can begin cracking in water heater 120 after temperatures are increased to greater than 450 deg C. By only recycling paraffin fraction stream 70, the production of coke is reduced. Utilizing water heater 120 to increase the temperature to greater than 450 deg C. allows the reactor 142 to operate at temperatures less than 450 deg C. which reduces the amount of coke produced from residue feedstock, while increase the amount of 1-olefins produced.

Figure 3:
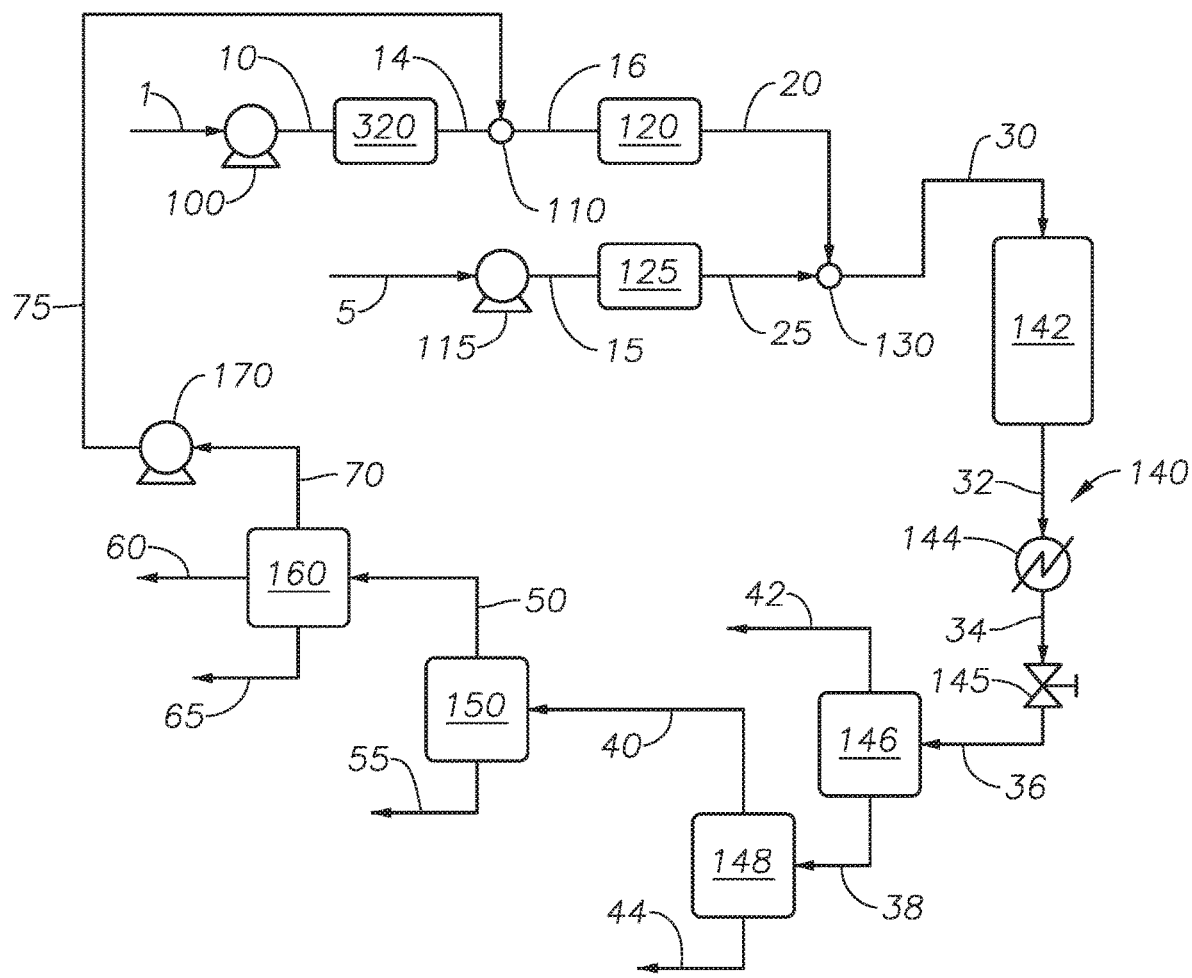
FIG. 3 provides a process diagram of an embodiment of the process.

An alternate embodiment of the process to produce olefins can be understood with reference to FIG. 3 and by reference to FIG. 1. Pressurized water feed 10 is introduced to pre-heater 320. Pre-heater 320 can be any type of heat exchanger capable of increasing the temperature of pressurized water feed 10. Pre-heater 320 can be a shell and tube heat exchanger, an electric heat exchanger, and a fired heater. In at least one embodiment, pre-heater 320 can be a cross-exchanger that removes heat from reactor effluent stream 32 and introduces the heat to pressurized water feed 10. The temperature of pressurized water feed 10 is increased in pre-heater 320 to produce pre-heated water 14. The temperature of pre-heated water 14 can be less than the critical temperature of water, alternately less than 350 deg C., alternately between 340 deg C. and 350 deg C., alternately between ambient temperature and 350 deg C., and alternately between ambient temperature and 374 deg C. Pre-heater 320 can be designed so that the flow through pre-heater 320 is in the turbulent regime of flow. Pre-heated water 14 is introduced to water mixer 110.

Pre-heated water 14 can be mixed with pressurized paraffin stream 75 in water mixer 110 to produce pre-heated paraffin-water stream 16. Pre-heated paraffin-water stream 16 can be introduced to water heater 120. Advantageously, mixing pre-heated water with pressurized paraffin stream 75 can improves the mixing of paraffins with water, because warm water has better miscibility with paraffins than cold water. Improving the mixing between water and paraffins can reduce the amount of time required for mixing downstream of water heater 120. The temperature of pre-heated paraffin-water stream 16 can be increased in water heater 120 as described with reference to FIG. 1. The piping connecting pre-heater 320, water mixer 110, and water heater 120 can be design such that the flow through the piping is in the turbulent regime of flow. Maintaining the flow in the turbulent regime of flow will enhance mixing of paraffins with water.

Paraffin fraction stream 70 is in the absence of olefins, aromatics, and naphthenes. In at least one embodiment, paraffin fraction stream 70 contains greater than 99.9 wt % paraffins. Olefins, aromatics, and naphthenes can produce gases and coke when subjected to temperatures greater than 450 deg C., so a paraffin fraction stream 70 that is greater than 99.9 wt % paraffins can minimize the formation of gases and coke. Additionally, condensation reactions would compete with cracking reactions at temperatures greater than 450 deg C., which would minimize the amount of 1-olefins produced. In at least one embodiment, residue feedstock 5 is in the absence of wax and alternately wax constitutes less than 10% of residue feedstock 5. The processes and systems described here are in the absence of externally provided steam or steam generation outside of the gas liquid separator, which can produce water vapor in the gas product. The paraffin fraction separated in extractor 160 are converted to 1-olefins and recovered as a product and are not used for extraction of other hydrocarbon compounds.

Recycling only the paraffin fraction from the light oil product specifically increases the production of light olefins. Recycling a hydrocarbon stream with many different components would not result in the same targeted paraffin cracking reactions as the process and system described here.

Advantageously, the ratio of water to paraffins in paraffin-containing stream and residence time under 10 minutes in the water heater reduce or eliminate secondary reactions of the 1-olefins. Maintaining the temperature of the reactor at less than 450 deg C. further reduces or eliminates the amount of 1-olefins engaging in secondary reactions. Advantageously, the 1-olefins produced from cracking paraffins in the water heater do not further react and can be separated in the extractor.

EXAMPLES

Example 1. Example 1 was a pilot experiment having the process of FIG. 2 without the extractor. Two runs were performed. In Run 1, no paraffins were recycled. The results from Run 1 were used to estimate an amount of paraffins for recycle. For both Runs the following conditions were used. Residue feedstock 5 was a deasphalted oil from a vacuum residue fraction. Water feed 1 was a demineralized water having a conductivity of 0.056 µS/cm. The flow rate at SATP of residue feedstock 5 was 35 kg/hr and water feed 1 was 105 kg/hr. The temperature of hot feedstock 25 was 180 deg C. Water heater 120 was a coiled pipe 35 meters in length with an outer diameter of 38.1 mm and a thickness of 5 mm providing a residence time of about 1.1 minutes and the temperature of the outlet stream was 540 deg C. Reactor 142 of supercritical unit 140 was five pipes, each 4 meters in length with an inner diameter of 40 mm, arranged vertically in series. The flow direction was downflow in pipes one, three, and five and upflow in pipes two and four. The temperature in reactor 142 was measured at the outlet by thermocouple. Each pipe had a thermocouple positioned in the outlet to measure temperature. The temperature of mixed feed stream was 438 deg C. and the temperature was controlled to obtain a temperature in the effluent stream of reactor pipe one of 452 deg C. The temperature change across each of pipes two, three, four, and five was plus or minus (+/−) 1.5 deg C. Reactor effluent stream 32 was cooled in heat exchanger 144 such that cooled stream 34 had a temperature of 125 deg C. Let down device 145 was two pressure control valves in series and the pressure of depressurized stream 36 was 1.5 bar (0.15 MPa). Gas-liquid separator 146 was a vertical vessel-type separator with a cooling jacket surround the exterior and the temperature of liquid phase 38 was 70 deg C. Liquid phase 38 was introduced to oil-water separator 148 with 500 wt ppm demulsifier. Fractionator 150 was a distillation column. Table 1 provides the properties of the streams.

TABLE 1

Stream properties for Example 1 of Run 1.

|  | Residue Feedstock 5 | Light oil product 50 | Heavy oil Product 55 | Combined Heavy Oil Product 55 and Aromatic Product 65 |
| --- | --- | --- | --- | --- |
| API Gravity | 13.7 | 43.3 | 15.2 | 17.0 |
| Sulfur (wt %) | 3.8 | 0.87 | 3.7 | 3.5 |
| MCR (wt %) | 15.5 | — | 3.9 | 3.7 |
| Asph, wt % | 4.9 | — | 1.2 | 1.1 |
| Vis@121 F., cSt | 596 | 0.9 | 171 | 97 |
| Distillation | ASTM D 7169 | ASTM D 2287 | ASTM D 7169 | ASTM D 7169 |
| 5% | 372 | 112 | 333 | 207 |
| 10% | 409 | 129 | 374 | 282 |
| 30% | 506 | 170 | 457 | 421 |
| 50% | 585 | 200 | 496 | 491 |
| 70% | 663 | 238 | 579 | 567 |

Figure 4:
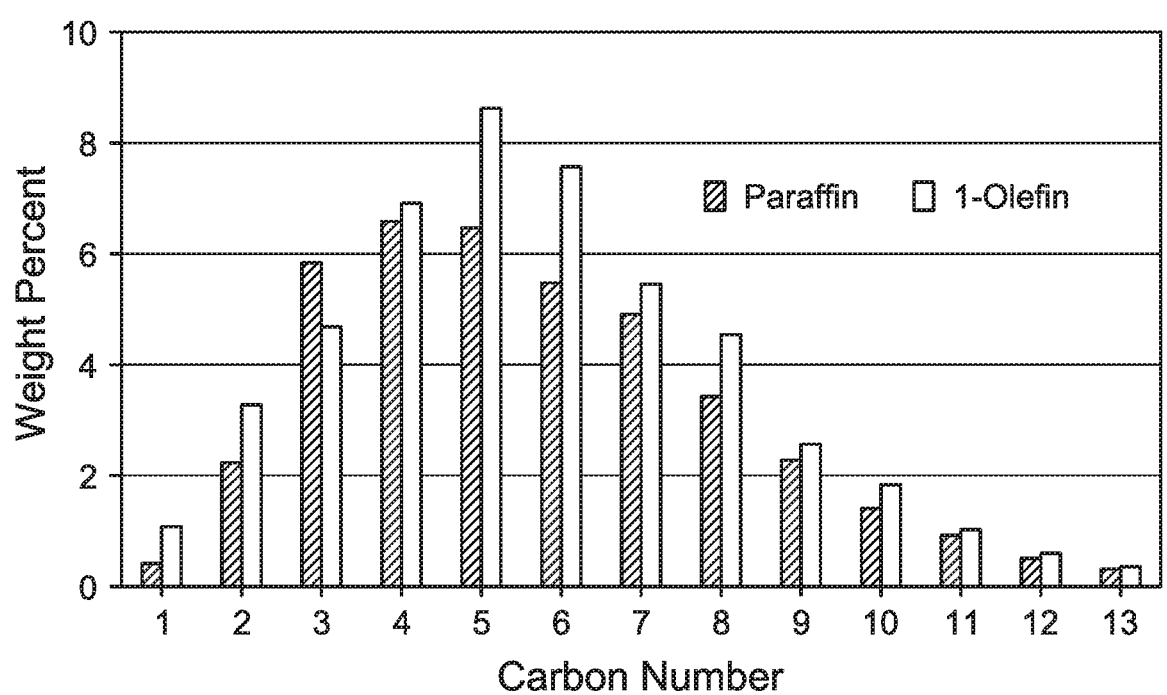
FIG. 4 is a graphical representation of the amounts of paraffins and olefins in Run 2 of Example 1.

At the conclusion of Run 1 light oil product 50 was analyzed by gas chromatography mass spectrometry (GC-MS) instrument and PIONA (paraffins, iso-paraffins, olefins, naphthenes, and aromatics) analyzer. The results showed that light oil product 50 included 41 wt % paraffins, 49 wt % olefins, and 10 wt % aromatics and naphthenes. In the olefinic fraction, linear 1-olefins were present in an amount greater than 95 wt %. The results of the paraffins and 1-olefins are shown in FIG. 4 and Table 2.

TABLE 2

Flow rates for streams of Run 1

|  | Amount (wt %) | Flow rate (kg/hr) |
| --- | --- | --- |
| Input |  |  |
| Residue Feedstock 5 | 100.0 | 35 |
| Total | 100.0 | 35.0 |
| Output |  |  |
| Gas product 42 | 2.8% | 0.98 |
| Heavy oil product 55 | 75.7% | 26.51 |

TABLE 2-continued

Flow rates for streams of Run 1

|  | Amount (wt %) | Flow rate (kg/hr) |
| --- | --- | --- |
| Loss | 0.3% | 0.09 |
| Light oil product 50 | 21.2% | 7.42 |
| Paraffins | 41.0% | 3.04 |
| Olefins | 49.0% | 3.64 |
| Aromatics + Naphthenes | 10% | 0.74 |

The results in Table 2 assume no paraffins are recycled.

For Run 2, a paraffin recovery yield of 95 wt % from the extractor was assumed. The flow rate of paraffin fraction stream 70 was set to 2.89 kg/hr (3.04 kg/hr times 0.95) and was pressurized to the same pressure as pressurized water feed 10. Pressurized paraffin stream 75 and pressurized water feed 10 were mixed in water mixer 110 with the reaction and separation conditions as described with respect to Run 1. Table 3 shows the results from Run 2.

TABLE 3

Flow rates for streams of Run 2

|  | Amount (wt %) | Flow rate (kg/hr) |
| --- | --- | --- |
| Input |  |  |
| Residue Feedstock 5 | 92 | 35 |
| Paraffin fraction stream 70 | 8 | 2.89 |
| Total | 100 | 37.89 |
| Output |  |  |
| Gas product 42 | 3.4 | 1.29 |
| Heavy oil product 55 | 73.4 | 27.82 |
| Loss | 0.3 | 0.1 |
| Light oil product 50 | 22.9 | 8.68 |
| Paraffins | 39.0 | 3.38 |
| Olefins | 52.0 | 4.51 |
| Aromatics + Naphthenes | 9.0 | 0.78 |

Recycling the paraffin fraction to upstream of the water heater increases olefin production from 3.64 kg/hr to 4.51 kg/hr.

Comparing Table 2 to Table 1 of Example 1 shows that the composition of the light fraction and heavy fraction, including the amount of water in each stream depends on the operating conditions in gas-liquid separator 146.

Although the present embodiments have been described in detail, it should be understood that various changes, substitutions, and alterations can be made hereupon without departing from the principle and scope. Accordingly, the scope of the embodiments should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value and to about another particular value or to about another particular value. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art, except when these references contradict the statements made here.

As used throughout this application and in the appended claims, the words "comprise," "has," and "include" and all grammatical variations are each intended to have an open, non-limiting meaning that does not exclude additional elements or steps.

As used here, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the embodiments.

That which is claimed:

1. A process for producing olefins, the process comprising the steps of:
    introducing a liquid oil from a supercritical unit to a fractionator, the fractionator configured to separate the liquid oil;
    separating the liquid oil in the fractionator to produce a light oil product and a heavy oil product;
    introducing the light oil product to an extractor, the extractor configured to separate the light oil product;
    separating the light oil product in the extractor to produce a paraffin fraction stream, an olefin product, and an aromatic product, wherein the olefin product comprises 1-olefins, wherein the aromatic product comprises aromatics and naphthalenes, wherein the paraffin fraction stream comprises short chain paraffins, wherein the paraffin fraction stream is in the absence of olefins, aromatics, and naphthenes;
    increasing a pressure of the paraffin fraction stream in a paraffin pump to produce a pressurized paraffin stream;
    introducing the pressurized paraffin stream to a water mixer, the water mixer configured to mix a hydrocarbon stream and a water stream;
    mixing the pressurized paraffin stream with a pressurized water feed in the water mixer to produce a paraffin-containing water stream, wherein a pressure of the paraffin-containing water stream is greater than the critical pressure of water;
    introducing the paraffin-containing water stream to a water heater, the water heater configured to heat the paraffin-containing water stream;
    heating the paraffin-containing water stream in the water heater to produce a hot paraffin-water stream, wherein a temperature of the hot paraffin-water stream is greater than 450 deg C., wherein a residence time in the water heater is between 10 seconds and 10 minutes, wherein the short chain paraffins in the hot paraffin-water stream are operable to crack at the temperature of the hot paraffin-water stream such that hot paraffin-water stream comprises 1-olefins;
    introducing the hot paraffin-water stream to a feed mixer;
    introducing a hot feedstock to the feed mixer, wherein the hot feedstock comprises hydrocarbons;
    mixing the hot paraffin-water stream and the hot feedstock in the feed mixer to produce a mixed feed stream; and
    introducing the mixed feed stream to the supercritical unit.

2. The process of claim 1, further comprising the steps of:
    introducing a water feed to a water pump, the water pump configured to increase a pressure of the water feed; and
    increasing the pressure of the water feed to produce the pressurized water feed, wherein the pressure of the water feed is greater than the critical pressure of water.

3. The process of claim 1, further comprising the steps of:
    introducing a residue feedstock to a residue pump, the residue pump configured to increase a pressure of the residue feedstock;
    increasing the pressure of the residue feedstock to produce a high pressure feedstock, wherein the pressure of the high pressure feedstock is greater than the critical pressure of water;
    introducing the high pressure feedstock to a residue heater, the residue heater configured to increase a temperature of the high pressure feedstock; and
    increasing the temperature of the high pressure feedstock to produce the hot feedstock, wherein the hot feedstock is a temperature between 30 deg C. and 150 deg C.

4. The process of claim 1, further comprising the steps of:
    introducing the mixed feed stream to a reactor of the supercritical unit, the reactor configured to treat the mixed feed stream, wherein the mixed feed stream comprises n-paraffins, water, residue-containing hydrocarbons, and combinations of the same;
    reacting the mixed feed stream in the reactor to produce a reactor effluent stream, wherein the reactor effluent stream comprises 1-olefins and upgraded hydrocarbons such that the upgraded hydrocarbons are upgraded relative to the hydrocarbons in the hot feedstock;
    introducing the reactor effluent stream to a heat exchanger, the heat exchanger configured to reduce a temperature of the reactor effluent stream;
    reducing the temperature of the reactor effluent stream in the heat exchanger to produce a cooled effluent;

introducing the cooled stream to a letdown device, the letdown device configured to reduce a pressure of the cooled effluent;

reducing the pressure of the cooled effluent in the letdown device to produce a depressurized stream;

introducing the depressurized stream to a gas-liquid separator, the gas-liquid separator configured to separate gases from the depressurized stream;

separating the depressurized stream in the gas-liquid separator to produce a gas product and a liquid phase;

introducing liquid phase to an oil-water separator, the oil-water separator configured to separate water from the liquid phase; and separating the liquid phase in the oil-water separator to produce the liquid oil and a water product.

5. The process of claim 4, wherein a temperature in the reactor is between 380 and 450 deg C.

6. The process of claim 1, wherein a temperature of the hot paraffin-water stream is between 500 deg C. and 550 deg C.

7. The process of claim 1, wherein a ratio of the volumetric flow rate of the residue feedstock to the water feed at standard atmospheric temperature and pressure is between 1:2 to 1:4.

8. A process for producing olefins, the process including the steps of:

introducing a liquid oil from a supercritical unit to a fractionator, the fractionator configured to separate the liquid oil;

separating the liquid oil in the fractionator to produce a light oil product and a heavy oil product;

introducing the light oil product to an extractor, the extractor configured to separate the light oil product;

separating the light oil product in the extractor to produce a paraffin fraction stream, an olefin product, and an aromatic product, wherein the olefin product comprises 1-olefins, wherein the aromatic product comprises aromatics and naphthalenes, wherein the paraffin fraction stream comprises short chain paraffins, wherein the paraffin fraction stream is in the absence of olefins, aromatics, and naphthenes;

increasing a pressure of the paraffin fraction stream in a paraffin pump to produce a pressurized paraffin stream;

introducing the pressurized paraffin stream to a water mixer, the water mixer configured to mix a hydrocarbon stream and a water stream;

mixing the pressurized paraffin stream with a pre-heated water in the water mixer to produce a pre-heated paraffin-water stream, wherein a pressure of the pre-heated paraffin-water stream is greater than the critical pressure of water, wherein a temperature of the pre-heated paraffin-water stream is less than the critical temperature of water;

introducing the pre-heated paraffin-water stream to a water heater, the water heater configured to heat the pre-heated paraffin-water stream;

heating the pre-heated paraffin-water stream in the water heater to produce a hot paraffin-water stream, wherein a temperature of the hot paraffin-water stream is greater than 450 deg C., wherein a residence time in the water heater is between 10 seconds and 10 minutes, wherein the short chain paraffins in the hot paraffin-water stream are operable to crack at the temperature of the hot paraffin-water stream such that hot paraffin-water stream comprises 1-olefins;

introducing the hot paraffin-water stream to a feed mixer;

introducing a hot feedstock to the feed mixer, wherein the hot feedstock comprises hydrocarbons;

mixing the hot paraffin-water stream and the hot feedstock in the feed mixer to produce a mixed feed stream; and introducing the mixed feed stream to the supercritical unit.

9. The process of claim 8, further comprising the steps of:

introducing a water feed to a water pump, the water pump configured to increase a pressure of the water feed;

increasing the pressure of the water feed to produce the pressurized water feed, wherein the pressure of the water feed is greater than the critical pressure of water;

introducing the pressurized water feed to a pre-heater, the pre-heater configured to increase a temperature of the pressurized water feed to produce a pre-heated water; and increasing a temperature of the pressurized water feed to produce the pre-heated water.

* * * * *